United States Patent [19]
DeCesare

[11] Patent Number: 5,949,368
[45] Date of Patent: Sep. 7, 1999

[54] ADAPTIVE CONSTANT FALSE ALARM RATE CIRCUIT WITH EXTREMELY LOW LOSS

[75] Inventor: Peter A. DeCesare, Ellicott City, Md.

[73] Assignee: Northrop Grumman Corporation, Los Angeles, Calif.

[21] Appl. No.: 09/001,943

[22] Filed: Dec. 31, 1997

[51] Int. Cl.[6] .................................................. G01S 7/34
[52] U.S. Cl. ........................................ 342/93; 342/159
[58] Field of Search ............................. 342/93, 91, 159, 342/162, 161, 195

[56] References Cited

U.S. PATENT DOCUMENTS

| | | | |
|---|---|---|---|
| 4,075,703 | 2/1978 | Dillard | 342/93 X |
| 4,137,532 | 1/1979 | Taylor, Jr. et al. | 342/93 |
| 4,213,127 | 7/1980 | Cole | 342/93 |
| 4,523,325 | 6/1985 | Justus | 342/93 X |
| 5,038,145 | 8/1991 | Decesare et al. | 342/93 |
| 5,499,030 | 3/1996 | Wicks et al. | 342/93 |
| 5,793,326 | 8/1998 | Hofele | 342/93 |
| 5,798,728 | 8/1998 | Tomishima et al. | 342/93 |

OTHER PUBLICATIONS

Radar Handbook, *Automatic Detection, Tracking, and Sensor Integration*, Second Edition, (1990) Merrill I. Skolnik, McGraw–Hill, Inc., pp. 8.12–8.21.

*Primary Examiner*—John B. Sotomayor

[57] ABSTRACT

A false alarm rate is maintained at or below a desired rate over a fluctuating mean noise level for providing additional sensitivity and increased range performance in a constant false alarm rate (CFAR) circuit in a radar system by: utilizing a variable CFAR detection threshold level for distances out to the radar's horizon; and, for distances beyond the radar's horizon, utilizing a relatively low fixed CFAR detection threshold level in place of the variable CFAR detection threshold level when there are no environmental factors present that produce additional radar returns.

21 Claims, 2 Drawing Sheets

5,949,368

ADAPTIVE CONSTANT FALSE ALARM RATE CIRCUIT WITH EXTREMELY LOW LOSS

BACKGROUND OF THE INVENTION

1. Field of the Invention

The present invention relates to constant false alarm rate circuitry in radar systems and more particularly to a constant false alarm rate process which enhances sensitivity at ranges beyond the radar's horizon to eliminate ground clutter, sea clutter, and ground/sea vehicular traffic.

2. Description of the Related Art

State of the art doppler radars, such as airport surveillance radars, typically operate in an environment where the noise generated within its own receiver is not the dominant source of interference. Undesired echoes from rain and clutter and undesired signals from other radiating sources often exceed the receiver noise levels. These sources of interference can operate to not only obliterate the radar display, but can overload the signal processor that is tracking valid targets of interest. In order to counteract this, the signal processing involves variable detection threshold levels being applied to the digital processor which then digitally compares the power level of the cell of interest with the current detection threshold presently being used to output a signal indicating whether a target is located in the cell of interest.

At each cell, one can define the probability of detection Pd of a desired target and the probability of false alarm Pfa from noise or one of the above sources of interference. The process by which the radar automatically adjusts its sensitivity as the intensity of interference varies is called constant false alarm rate or simply CFAR.

One known CFAR process, termed range averaging CFAR, operates to set the detection threshold based on the mean noise power which is generated by summing a plurality of noise samples over range. Another well known CFAR process is called clutter mapping. This involves determining the detection threshold from a time average of a noise power in a plurality of previous scans rather than from surrounding reference cells on the same scan.

The concept of CFAR is described in detail in Chap. 3, Sec. 3.13, pp. 3.46–3.53 and Chap. 8, Sec. 8.2, pp. 8.12–8.21 of, *Radar Handbook*, Merrill Skolnik, $2^{nd}$ Edition, 1990, McGraw-Hill, Inc. and can be referred, if necessary, for a better understanding of constant false alarm rate principles.

In U.S. Pat. No. 5,038,145, entitled, "Three Window Constant False Alarm Rate Circuit", Peter A. DeCesare, Aug. 6, 1991, and which is incorporated herein by reference, there is disclosed a range averaging CFAR for detecting targets while lowering the false alarm rate, for example, during severe weather by using three windows for calculating mean level thresholds. In addition to a lead window and a lag window, each separated from a cell of interest by a predetermined number of cells, a straddle window is used which includes the cell of interest. Each of the lead, lag and straddle windows are subjected to editing to remove three adjacent cells including the cell with the highest power level. The remaining cells are used to calculate a mean level threshold for each of the three windows. The largest of the three mean level thresholds is used, unless it is derived from the straddle window and it is significantly larger than the largest of the mean level thresholds derived from the lead and lag windows.

The present invention is an extension of this concept and results from an effort to extend the sensitivity in its constant false alarm rate circuitry for increased range performance.

SUMMARY

Accordingly, it is an object of the present invention to provide an improvement in radar systems.

It is another object of the invention to provide additional target sensitivity in connection with airport surveillance radar systems.

It is a further object of the invention to eliminate most, if not all, CFAR loss in an airport surveillance radar so that enhanced long range performance can be achieved.

It is yet another object to sense the presence of energy above thermal noise in a constant false alarm rate (CFAR) circuit of an airport surveillance radar.

Briefly, the foregoing and other objects are achieved by a method for maintaining a false alarm rate at or below a desired rate over a fluctuating mean noise level for providing additional sensitivity and increased range performance in a constant false alarm rate (CFAR) circuit in a radar system comprising the steps of: utilizing a variable CFAR detection threshold for distances out to the radar's horizon; and, for distances beyond the radar's horizon, utilizing a fixed CFAR detection threshold in place of the variable CFAR detection threshold when there are no environmental factors present that contribute additional radar returns and wherein the fixed CFAR detection threshold is set at a value for a desired false alarm rate less than about 99% of the variable detection threshold values of the CFAR circuit.

The foregoing and other objects are also attained by apparatus for maintaining a false rate at or below a desired rate over a fluctuating mean noise level so as to provide additional sensitivity and accordingly increased range performance in a constant false alarm rate (CFAR) circuit in a radar system comprising: a CFAR circuit responsive to signals received by the radar system and generating a variable CFAR detection threshold signal, a range signal of a range cell of interest, and a received energy signal of the range cell of interest; a source of site adjustable fixed range signals; a range comparator responsive to range signal inputs from said CFAR circuit and said source of fixed range signals and generating a first control signal in response to a comparison of said range signal of the cell of interest and a fixed range signal from the source of fixed range signals; a source of site adjustable fixed CFAR detection threshold signals; a circuit for determining whether a variable threshold or a fixed threshold is to be used for each scan of the radar system and generating a second control signal therefrom; a circuit responsive to said first and second control signals for selecting either said variable CFAR detection threshold signal from said CFAR circuit or a fixed CFAR detection threshold signal from said source of fixed threshold signals; and a signal comparator responsive to said received energy signal and a selected detection threshold signal for sensing a target in the received energy of the range cell of interest.

Further scope of applicability of the present invention will become apparent from the detailed description provided hereinafter. It should be understood, however, that the detailed description and specific example, while indicating the preferred embodiment of the inventions is provided by way of illustration only, since various changes and modifications within the spirit and scope of the invention will become apparent to those skilled in the art.

BRIEF DESCRIPTION OF THE DRAWINGS

The present invention will become more fully understood when considered together with the accompanying drawings which are provided for purposes of illustration only, and are thus not meant to be limitative of the invention, and wherein.

DETAILED DESCRIPTION OF THE INVENTION

The task at hand is sensing the presence of targets above thermal noise at ranges well beyond the horizon of a digital radar system in good weather, where the air is clear and more particularly to, but not limited to, an airport surveillance radar. Although a multitude of false alarms will normally be generated if a fixed CFAR detection threshold is used when significant energy is present above the expected noise level, it is the objective of the present invention to replace the variable CFAR detection threshold with a predetermined relatively low fixed detection threshold at long ranges where low target energies are present.

Beyond the radar horizon, the AGC monitors a fixed receiver noise level when there are no environmental factors that contribute additional radar returns. In such a scenario, a fixed detection threshold will provide the desired false alarm rate.

Accordingly, in the present invention, the false alarm rate is maintained at or below a desired rate over the fluctuating mean level by selectively using a site adjustable fixed CFAR detection threshold value in place of a variable detection threshold values beyond a certain range, which is also site adjustable, when there are no environmental factors present which generate additional radar returns, and where the fixed threshold value is set below about 99% of the variable threshold values.

Figure 1:
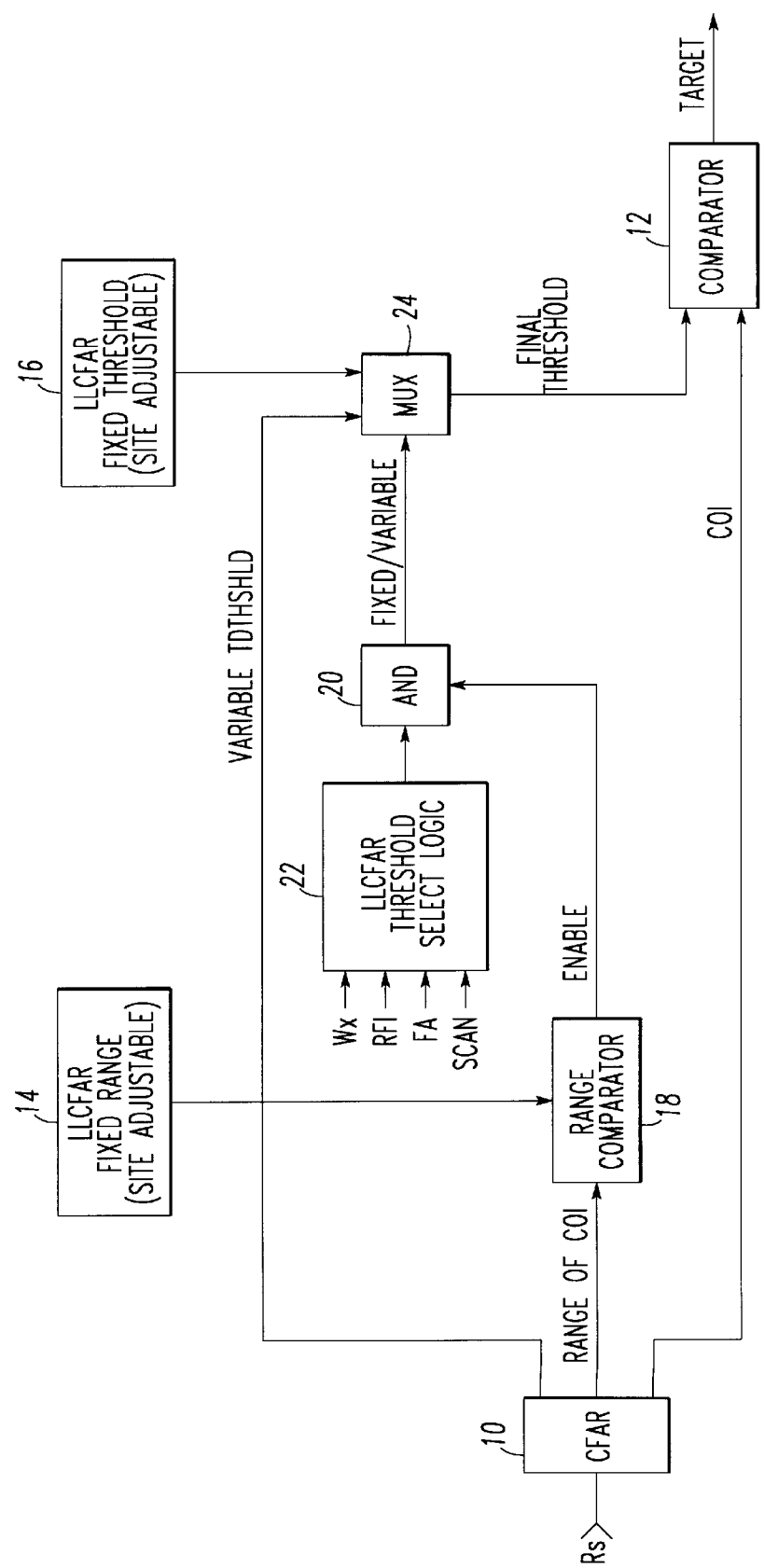
FIG. 1 is a block diagram illustrative of a preferred embodiment for practicing the invention.

This is achieved as follows. Referring now to FIG. 1, reference numeral 10 denotes a conventional range averaging CFAR circuit such as disclosed in U.S. Pat. No. 5,038, 145 and which is responsive to the received signals from a radar receiver, not shown, after Doppler filtering. The CFAR circuit 10 separates the received signals (RS) into range cells, each cell corresponding to a different distance from the radiating source. The range cells are furthermore edited to delete saturated echo signals, i.e. the power of the received signal on the range cell is above the limit of the receiver. In addition, range cells containing echo signals from another radiating source are excluded from further consideration. These range cells are identifiable due to the use of a different pulse repetition sequence by other radiating sources.

Once a range cell of interest (COI) is identified, it's power or amplitude is compared in a well known manner with a variable threshold value, i.e. a variable mean level CFAR threshold in a comparator 12, for example, which outputs a signal indicating whether a target is located in the cell of interest. The CFAR threshold value is typically determined from a table of stored values which vary depending upon the number of cells remaining after the cells containing saturation or interference, and a predetermined number of adjacent cells including the cell having the highest power level have been excluded.

The present invention operates to enhance the constant false alarm rate capability of a doppler radar by applying a predetermined relatively low fixed threshold level CFAR (LLCFAR) having a value less than about 99% of the variable CFAR threshold levels to the comparator 12 in place of the variable CFAR mean level threshold value as a function of range, weather, radio frequency interference, and false targets.

Figure 2:
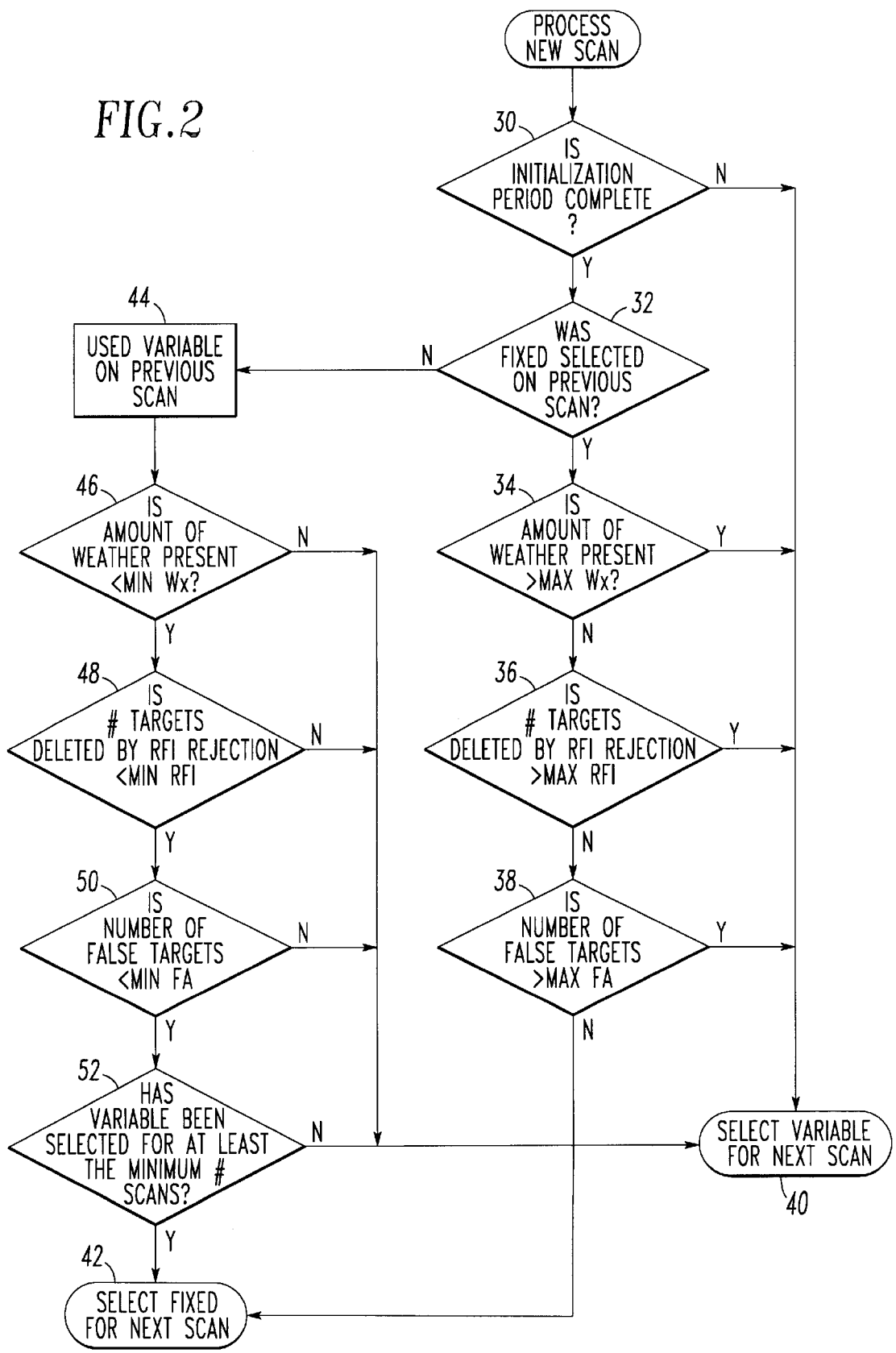
FIG. 2 is a flow chart illustrative of the method for practicing the subject invention.

Accordingly, a range table 14 having a predetermined number of fixed RANGE values as well as a table 16 of fixed LLCFAR threshold values, both of which are site adjustable, i.e. operator selectable at the radar installation, are used to implement the application of a fixed relatively low threshold value, as noted above, to the comparator 12 in accordance with a switching arrangement as shown in FIG. 1 and which operates in accordance with the logic scheme shown in FIG. 2.

Referring now to FIG. 1, a range comparator 18 receives a site adjustable fixed RANGE value from the table 14 along with the value of the range of a cell of interest (COI) from the CFAR circuit 10 and operates to generate an enabling signal, e.g. binary logic "1", which is applied to one input of a binary digital coincidence or AND logic gate 20 when the COI range is greater than the range value output from the range table 14. Otherwise, the output from the comparator is a logic "0". The other input of the AND gate 20 is coupled to the output of a threshold LLCFAR select logic section 22 which implements an algorithm based upon four operational parameters; weather (Wx), RF interference (RFI), false targets (FA) and the number of radar scans (SCAN#), and which outputs a logic "1" when a fixed LLCFAR threshold is to be selected. The AND gate 20 controls the operation of a multiplex (MUX) switch 24 which operates to apply either a variable mean threshold CFAR value from the CFAR circuit 10, or a fixed mean threshold LLCFAR value from the table 16 to the comparator 12.

When a binary "1" SELECT command is present along with a binary "1" ENABLE, the AND gate 20 will cause the multiplexer switch 24 to feed a relatively low fixed mean LLCFAR threshold value to the comparator 12 from the table 16. Otherwise, the variable mean CFAR threshold value will be fed from the CFAR circuit 10 to the comparator 12.

Whether a LLCFAR or a CFAR mode is selected for a particular scan of the radar is determined in accordance with the flow chart shown in FIG. 2. Referring now to FIG. 2, for each radar scan, a determination is made as to whether or not a predetermined initialization or settling period has been completed as shown by step 30. This is performed because the LLCFAR mode is inhibited at system start-up to allow time for the radar system to settle, particularly its transmitter and the AGC section. Optimum AGC performance is reached after a time, for example, 10 minutes. If necessary, this step can be overridden.

Therefore, the LLCFAR mode remains unavailable for a minimum number of system cycles after start-up. This is termed a "sleep" mode. This feature can also be used during a transition from the CFAR mode to the LLCFAR mode to reduce oscillations that might otherwise occur.

According to step 30, if an initialization period has not been completed, a variable CFAR threshold will be selected for the next scan cycle of the radar. If initialization has been completed, step 32 determines whether a fixed LLCFAR threshold had been selected on the previous scan. Depending on the outcome of step 32, three determinations 34, 36 and 38 are made from input parameters corresponding to weather (Wx), RF interference (RFI), and false targets (FA). If a fixed LLCFAR threshold has been selected on the previous scan and if any one of the Wx, RFI and FA parameters is greater than a maximum value therefor set into the system as shown by steps 34, 36 and 38, the fixed LLCFAR threshold will be "deselected" and a variable CFAR threshold will be input to the comparator 12 (FIG. 1) on the next scan. On the other hand, if all three of these parameters are less than maximum value, the fixed LLCFAR threshold will again be selected for the next scan as shown by step 42.

Going back to step 32, if a fixed LLCFAR threshold had not been selected on the previous scan, but a variable CFAR. threshold had been used as indicated by reference numeral 44, four determinations are made as shown in steps 46, 48, 50 and 52 before the next scan. If the amount of weather Wx present is less than a predetermined minimum value of Wx, the number of targets deleted by RF rejection is less than a predetermined minimum value of RFI, and the number of false targets is less than a predetermined minimum number of false targets (FA), and a variable CFAR threshold has been selected for at least a minimum number of previous scans, typically 6 scans, then a fixed LLCFAR threshold will be selected on the next scan. However, if any of these conditions is not met, then a variable CFAR threshold will again be selected. Thus, four criterion must be met for a fixed LLCFAR threshold to be selected, as shown by reference numeral 42, otherwise the variable threshold is selected for the next scan, as evidenced by reference numeral 40.

Stated another way, if a fixed LLCFAR threshold having a value below about 99% of the variable CFAR threshold levels is currently selected, it is deselected and a variable CFAR threshold selected if any of the following are true: (1) The range is less than a fixed range selected from the table of values 14; (2) The number of weather cells is greater than a predetermined upper threshold; (3) The RF frequency interference is greater than a predetermined upper threshold; and (4) The total number of false alarms is greater than a predetermined upper threshold.

Conversely, if a variable CFAR threshold is currently selected, it is deselected and a fixed LLCFAR threshold from the table of values 16 will be selected and having a value less than about 99% of the variable CFAR threshold levels only if all of the following are true after six successive scans: (1) the range is greater than the fixed range selected at the site from the table 14, (2) the number of weather cells is less than a predetermined lower threshold, (3) the RF interference is less than a predetermined lower threshold, (4) and the total number of false targets is less than a lower predetermined threshold.

Having thus shown and described what is at present considered to be the preferred method and embodiment of the present invention, it should be noted that the same has been made by way of illustration and not limitation. Accordingly, all modifications, alterations and changes coming within the spirit and scope of the invention as set forth in the appended claims are herein meant to be included.

I claim:

1. A method of maintaining a false rate at or below a desired false alarm rate over a fluctuating mean noise level so as to provide additional sensitivity and accordingly increased range performance in a constant false alarm rate (CFAR) circuit in radar system, comprising the steps of:
    utilizing a variable CFAR detection threshold level for distances out to a predetermined range; and
    for distances beyond said predetermined range, utilizing a predetermined relatively low fixed CFAR detection threshold level in place of the variable CFAR detection threshold, said fixed threshold level having a value less than about 99% of the variable CFAR detection threshold levels, and
    wherein the fixed threshold level is a function of range, weather, radio frequency interference and false targets.

2. A method in accordance with claim 1 wherein said predetermined range comprises a horizon of the radar system.

3. A method in accordance with claim 2 wherein the step of utilizing a fixed detection threshold comprises utilizing a fixed detection threshold level when only noise is present.

4. A method in accordance with claim 1 wherein the step of utilizing said fixed CFAR detection threshold level is performed when the number of targets deleted by radio frequency interference rejection is less than a predetermined minimum of radio frequency interference.

5. A method in accordance with claim 1 wherein the step of utilizing said fixed CFAR detection threshold level is performed when the number of false targets is less than a predetermined minimum of false targets.

6. A method in accordance with claim 1 wherein the radar system comprises a digital radar system.

7. A method in accordance with claim 1 wherein the radar system comprises an airport surveillance radar.

8. A method in accordance with claim 1 wherein the step of utilizing a fixed detection threshold comprises utilizing a fixed detection threshold level in weather where the air is relatively clear.

9. A method in accordance with claim 1 wherein said step of utilizing said fixed CFAR threshold level is initially inhibited at system start up.

10. A method in accordance with claim 1 wherein said step of utilizing said fixed CFAR threshold level is enabled after a predetermined number of radar scans utilizing said variable CFAR threshold.

11. Apparatus for maintaining a false rate at or below a desired rate over a fluctuating mean noise level so as to provide additional sensitivity and accordingly increased range performance in a constant false alarm rate (CFAR) circuit in a radar system comprising:
    a CFAR circuit responsive to signals received by the radar system and generating a variable CFAR detection threshold signal, a range signal of a range cell of interest, and a received energy signal of the range cell of interest;
    a source of site adjustable relatively low fixed range signals;
    a range comparator responsive to range signal inputs from said CFAR circuit and said source of fixed range signals and generating a first control signal in response to a comparison of said range signal of said cell of interest and a fixed range signal from said source of fixed range signals;
    a source of site adjustable relatively low fixed CFAR detection threshold signals;
    a circuit for determining whether a variable threshold or a fixed threshold is to be used for each scan of the radar system and generating a second control signal therefrom;
    a circuit responsive to said first and second control signals for selecting either said variable CFAR detection threshold signal from said CFAR circuit or a fixed CFAR detection threshold signal from said source of fixed threshold signals; and
    a signal comparator responsive to said received energy signal and a selected detection threshold signal for sensing a target in the received energy of the range cell of interest.

12. Apparatus according to claim 11 wherein said fixed detection threshold signals have a value less than about 99% of the threshold values of the variable detection threshold signal.

13. Apparatus according to claim 12 wherein said circuit for determining implements a threshold selecting algorithm based on weather conditions, RF interference and a desired false alarm rate, and scan count.

14. Apparatus according to claim 12 wherein a fixed CFAR detection threshold is used at long range when there are substantially no environmental factors present that produce additional radar returns.

15. Apparatus according to claim 12 wherein a fixed CFAR detection threshold is used at long range when only noise is present.

16. Apparatus according to claim 12 wherein said fixed CFAR detection threshold is used at long range when the air is relatively clear.

17. Apparatus according to claim 12 wherein said fixed CFAR detection threshold is selected following a predetermined number of consecutive radar scans while selecting variable threshold when a weather parameter is below a predetermined minimum value, an RF interference parameter is below a predetermined minimum value, and a false alarm parameter is below a predetermined minimum value.

18. Apparatus according to claim 12 wherein said radar system comprises a digital radar and wherein said source of fixed range signals and said source of fixed detection threshold signals comprise digital signal value tables.

19. Apparatus according to claim 12 wherein said circuit for selecting includes a digital logic gate responsive to the first and second control signal and a multiplexer responsive to a logic output signal generated by said logic gate.

20. Apparatus according to claim 19 wherein said logic gate comprises an AND gate.

21. Apparatus according to claim 12 wherein said radar system comprises an airport surveillance radar.

* * * * *